US008724959B2

(12) United States Patent
Murakami

(10) Patent No.: US 8,724,959 B2
(45) Date of Patent: May 13, 2014

(54) IMAGE RECORDING APPARATUS AND IMAGE DISPLAYING METHOD

(75) Inventor: Naoyuki Murakami, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1935 days.

(21) Appl. No.: 11/676,625

(22) Filed: Feb. 20, 2007

(65) Prior Publication Data
US 2007/0201839 A1  Aug. 30, 2007

(30) Foreign Application Priority Data

Feb. 27, 2006  (JP) .................................. 2006-050589

(51) Int. Cl.
*H04N 5/77* (2006.01)
(52) U.S. Cl.
USPC ......................................... 386/224; 386/225
(58) Field of Classification Search
USPC ................. 386/1, 45–46, 117, 121, 125–126, 386/224–229, 248; 348/220.1
See application file for complete search history.

(56) References Cited

U.S. PATENT DOCUMENTS

| 6,226,449 | B1 * | 5/2001 | Inoue et al. ................... 386/225 |
| 6,408,089 | B1 * | 6/2002 | Ito et al. ........................ 382/141 |
| 6,424,795 | B1 * | 7/2002 | Takahashi et al. ............. 386/225 |
| 6,430,221 | B1 * | 8/2002 | Katsumata ............... 375/240.01 |
| 6,754,440 | B2 | 6/2004 | Takahashi et al. |
| 7,106,954 | B2 * | 9/2006 | Inoue et al. .................... 386/230 |
| 7,505,074 | B2 | 3/2009 | Yoshino |
| 7,535,497 | B2 * | 5/2009 | Ouchi ........................... 348/239 |
| 2004/0208481 | A1 | 10/2004 | Hosokawa |
| 2005/0083414 | A1 * | 4/2005 | Hidaka et al. .............. 348/220.1 |

FOREIGN PATENT DOCUMENTS

| CN | 1692648 A | 11/2005 |
| JP | 2004201170 A | 7/2004 |
| JP | 3551181 B2 | 8/2004 |
| JP | 2004297229 A | 10/2004 |
| JP | 2005-223765 A | 8/2005 |
| JP | 2005-341206 A | 12/2005 |

* cited by examiner

*Primary Examiner* — Thai Tran
*Assistant Examiner* — Nigar Chowdhury
(74) *Attorney, Agent, or Firm* — Canon USA, Inc. IP Division

(57) ABSTRACT

At least one exemplary embodiment is directed to an image recording apparatus configured to display an identification image of a moving image recorded on a recording medium and to display a moving image corresponding to a specified identification image. If the specified identification image corresponds to a moving image encoded according to a moving image coding method generated from a plurality of still images encoded according to a still image coding method, the image recording apparatus serially displays a plurality of still images encoded according to the still image coding method from which the moving image has been generated.

9 Claims, 13 Drawing Sheets

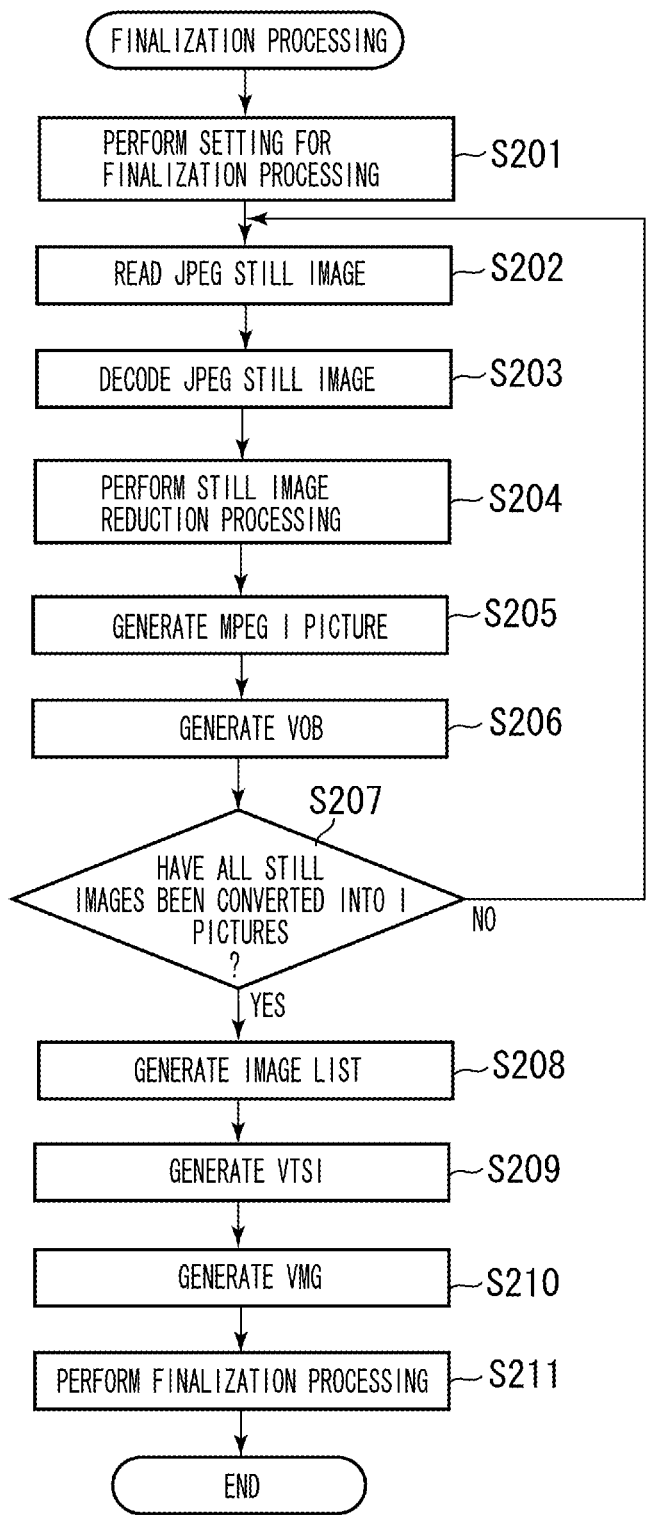

FIG. 7A

| VTS NAME | MPEG MOVING IMAGE NAME | REPRODUCTION INTERVAL | NAME OF LINKED JPEG STILL IMAGE |
|---|---|---|---|
| VTS10 | img0010.mpg | 3 SECONDS | img0001.jpg |
| | | | img0002.jpg |
| | | | img0003.jpg |
| | | | img0004.jpg |
| | | | img0005.jpg |
| | | | img0006.jpg |
| | | | img0007.jpg |
| | | | img0008.jpg |
| | | | img0009.jpg |

FIG. 7B

| VTS NAME | MPEG MOVING IMAGE NAME | REPRODUCTION INTERVAL | NAME OF LINKED JPEG STILL IMAGE |
|---|---|---|---|
| VTS10 | img0010.mpg | 3 SECONDS | img0001.jpg |
| | | | img0002.jpg |
| | | | img0003.jpg |
| | | | img0004.jpg |
| | | | img0005.jpg |
| | | | img0006.jpg |
| VTS11 | img0011.mpg | 5 SECONDS | img0007.jpg |
| | | | img0008.jpg |
| | | | img0009.jpg |

IMAGE RECORDING APPARATUS AND IMAGE DISPLAYING METHOD

BACKGROUND OF THE INVENTION

1. Field of the Invention

The present invention relates to a technique for displaying a still image according to a still image coding method and a moving image according to a moving image coding method.

2. Description of the Related Art

Some image recording apparatuses such as digital video cameras use a digital versatile disc (DVD) as a recording medium to record a still image and a moving image thereon. Such an image recording apparatus can separately and individually record a moving image and a still image on the same recording medium.

In addition, the image recording apparatus, in recording a moving image, encodes a moving image using a Moving Picture Experts Group (MPEG) method as a coding method. The image recording apparatus records the encoded moving image on a DVD according to a format such as DVD-Video format or DVD Video Recording format.

In recording a still image, the image recording apparatus records a still image using a Joint Photographic Experts Group (JPEG) method as a coding method. The image recording apparatus records the encoded still image according to a format such as Exchangeable image file format (Exif) or Design rule for Camera File system (DCF) format.

As described above, in an image recording apparatus, mutually different coding methods and recording formats are used for recording a moving image and a still image, respectively. Accordingly, in order to reproduce both a moving image and a still image, it is necessary that an image reproduction apparatus corresponding to the image recording apparatus is compliant with both coding methods and both recording formats. That is, it is necessary that the image reproduction apparatus include decoders (decoding unit) compliant with both the MPEG coding method and the JPEG coding method.

Accordingly, a reproduction apparatus, such as a conventional DVD player, which includes only an MPEG decoder, can reproduce a moving image portion but is incapable of reproducing a still image from a recording medium having the still image recorded thereon.

Japanese Patent Application Laid-Open No. 2004-201170, Japanese Patent Application Laid-Open No. 2004-297229, and Japanese Patent Registration No. 3551181 discuss a method for encoding a still image into a moving image compliant with the MPEG coding method by converting a still image encoded by the JPEG coding method into an I (intra) picture defined by the MPEG coding method. This method enables a conventional image reproduction apparatus to reproduce a still image as a moving image compliant with the MPEG coding method.

However, the following problem arises in displaying a still image as an MPEG-coded moving image.

That is, in generating an MPEG-coded moving image according to a DVD format, there is a restriction on the resolution of a moving image. Even the maximum resolution of a moving image is lower than the resolution of a still image generated by an image recording apparatus. Accordingly, in converting a still image into a moving image, it is necessary to lower the resolution of a high-resolution still image down to a resolution equivalent to the resolution of a moving image. Thus, the image quality of a still image degrades. In addition, there is a restriction on a bit rate for a moving image according to a DVD format, which also causes the image quality to degrade.

If an image reproduction apparatus is equipped with both reproduction functions according to the MPEG coding method and the JPEG coding method, a JPEG-coded still image, which corresponds to a low-quality MPEG-coded moving image displayed by a user, can be identified and acquired to be displayed at a high-image quality. However, in the case where the user does not desire to display the still image in that way, that function is not useful considering a user's convenience. In addition, in that case, an operation performed for displaying the still image may become too complicated for the user.

SUMMARY OF THE INVENTION

The present invention is directed to displaying a plurality of high-quality still images corresponding to a moving image generated according to a moving image coding method with a simple operation and at an appropriate timing.

According to an aspect of the present invention, an image recording apparatus configured to record a still image and a moving image on a recording medium includes: a still image recording unit configured to encode a still image according to a still image coding method and to record the encoded still image on the recording medium; a moving image recording unit configured to encode a moving image according to a moving image coding method and to record the encoded moving image on the recording medium; a generation unit configured to generate a moving image according to the moving image coding method from a plurality of still images encoded according to the still image coding method and to record the generated moving image on the recording medium; an identification image display control unit configured to cause an identification image of a moving image recorded on the recording medium to be displayed on a display unit; a moving image information display control unit configured to cause a moving image corresponding to an identification image specified via the display unit to be displayed on the display unit; and a still image information display control unit configured to, if an identification image specified via the display unit corresponds to a moving image generated by the generation unit, cause a plurality of still images encoded according to the still image coding method from which the moving image has been generated to be sequentially displayed on the display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 6 is a flow chart illustrating processing for converting a JPEG still image into an MPEG format image according to the first exemplary embodiment of the present invention.

FIG. 7A and FIG. 7B each illustrate an example of an image list according to the first exemplary embodiment of the present invention.

DETAILED DESCRIPTION OF THE EMBODIMENTS

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

First Exemplary Embodiment

Figure 1:
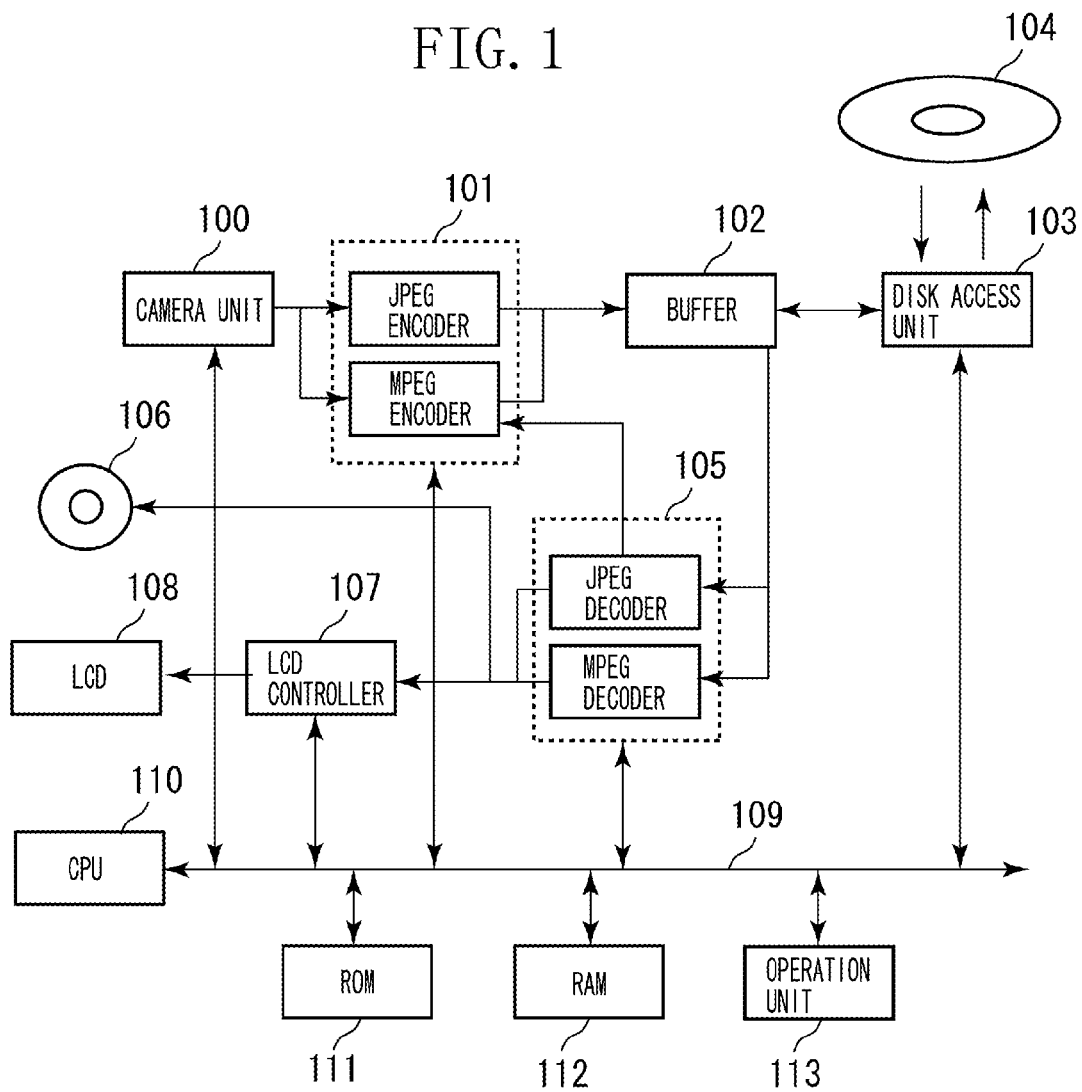
FIG. 1 illustrates a functional configuration of an image recording apparatus according to a first exemplary embodiment of the present invention.

FIG. 1 illustrates a functional configuration of an image recording apparatus according to a first exemplary embodiment of the present invention. The image recording apparatus uses a DVD as a recording medium and is a video camera having both an image recording function and an image reproduction function.

The video camera according to the present exemplary embodiment includes a camera unit 100 and an encoder unit 101. The camera unit 100 includes a charge-coupled device (CCD) for inputting a video image as an electrical signal and has an electronic shutter function. The camera unit 100 is capable of selectively outputting a video signal for use as a moving image and a video signal for use as a still image.

The encoder unit 101 encodes video signals for a moving image and a still image input from the camera unit 100. The encoder unit 101 includes a JPEG encoder and an MPEG encoder. The JPEG encoder encodes a still image according to the JPEG coding method. The MPEG encoder encodes a moving image according to the MPEG coding method.

A buffer memory 102 is used in accessing a disk. The buffer memory 102 temporarily stores an encoded image output from the encoder unit 101. A disk access unit 103 writes data stored in the buffer memory 102 onto a disk 104 and reads data from the disk 104.

The disk 104 is a DVD on which a moving image and a still image picked up by the video camera can be recorded. In the present exemplary embodiment, the disk 104 is a DVD-rewritable (DVD-RW). However, a DVD of another type such as a DVD-recordable (DVD-R) and a DVD+RW can be used.

The video camera according to the present exemplary embodiment further includes a decoder unit 105, a liquid crystal display (LCD) 108, and an LCD controller 107. The decoder unit 105 includes a JPEG decoder and an MPEG decoder. The decoder unit 105 converts a JPEG still image or an MPEG moving image, which is respectively still image data or moving image data recorded on the disk 104, into an original video image. The LCD 108 displays the video image. Further, the video camera is capable of outputting a video signal to an external output terminal 106 without displaying a video image on the LCD 108 or while displaying a video image on the LCD 108. In outputting a video signal to the external output terminal 106, the decoder unit 105 generates data adapted for external output.

A central processing unit (CPU) 110 is connected to a read-only memory (ROM) 111, a random access memory (RAM) 112, an operation unit 113, and other blocks via a CPU bus 109, and is capable of controlling each block. The operation unit 113 transmits an input of instructions by a user performed via various operation keys and levers to the CPU 110.

Figure 2:
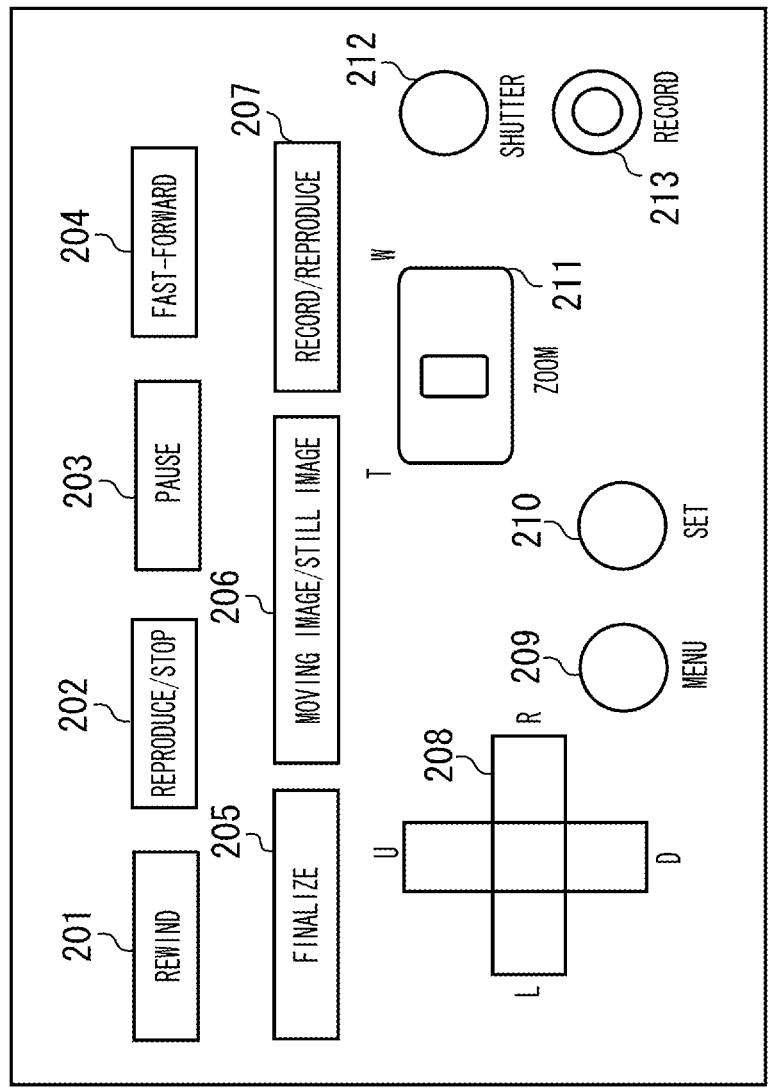
FIG. 2 illustrates an exemplary configuration of an operation unit according to an exemplary embodiment of the present invention.

FIG. 2 illustrates an exemplary configuration of the operation unit 113. The operation unit 113 includes buttons and the like mounted on a body side surface or a body rear surface of the video camera. Various operation signals are generated in response to a pressing operation and a sliding operation of these buttons, and the operation signals are sent to the CPU 110.

Referring to FIG. 2, a rewind button 201, a reproduce/stop button 202, a pause button 203, and a fast-forward button 204 are used in performing various moving image reproduction operations in a moving image reproduction mode.

A finalize button 205 is used for instructing a finalization, which is processing for enabling a DVD to be reproducible by another reproduction apparatus. A moving image/still image button 206 is a button for switching between moving image reproduction and still image reproduction in an image reproduction mode. A record/reproduce button 207 is a button for switching an operation mode of the video camera between a recording mode and a reproduction mode.

A cross key 208 is used for moving the position of a cursor in performing various settings via a display user interface (UI) such as an LCD. A menu button 209 is used for performing an instruction as to whether a menu screen is to be displayed on the display UI. A set button 210 is used primarily for entering a determination instruction at the time of operation via the display UI.

A zoom button 211 is used for adjusting the amount of zoom in the camera unit 100 in a recording mode. As an instruction by a user becomes closer to a "T" (telephoto) side, a zoom ratio becomes higher, and as an instruction by a user becomes closer to a "W" (wide-angle) side, the zoom ratio becomes lower. The zoom button 211 is also used for adjusting a display magnification of a reproduction image in a reproduction mode. A shutter button 212 is used for shooting a still image. When the shutter button 212 is pressed by a user, the camera unit 100 performs a still image shooting operation to output a video image for generating a still image. An image record button 213 is used for shooting a moving image. When the image record button 213 is pressed by a user, the camera unit 100 starts a moving image shooting operation to output a video image for generating a moving image.

Now, an operation performed at the time of recording an image on a DVD is described with reference to the flow chart of FIG. 3.

Figure 3:
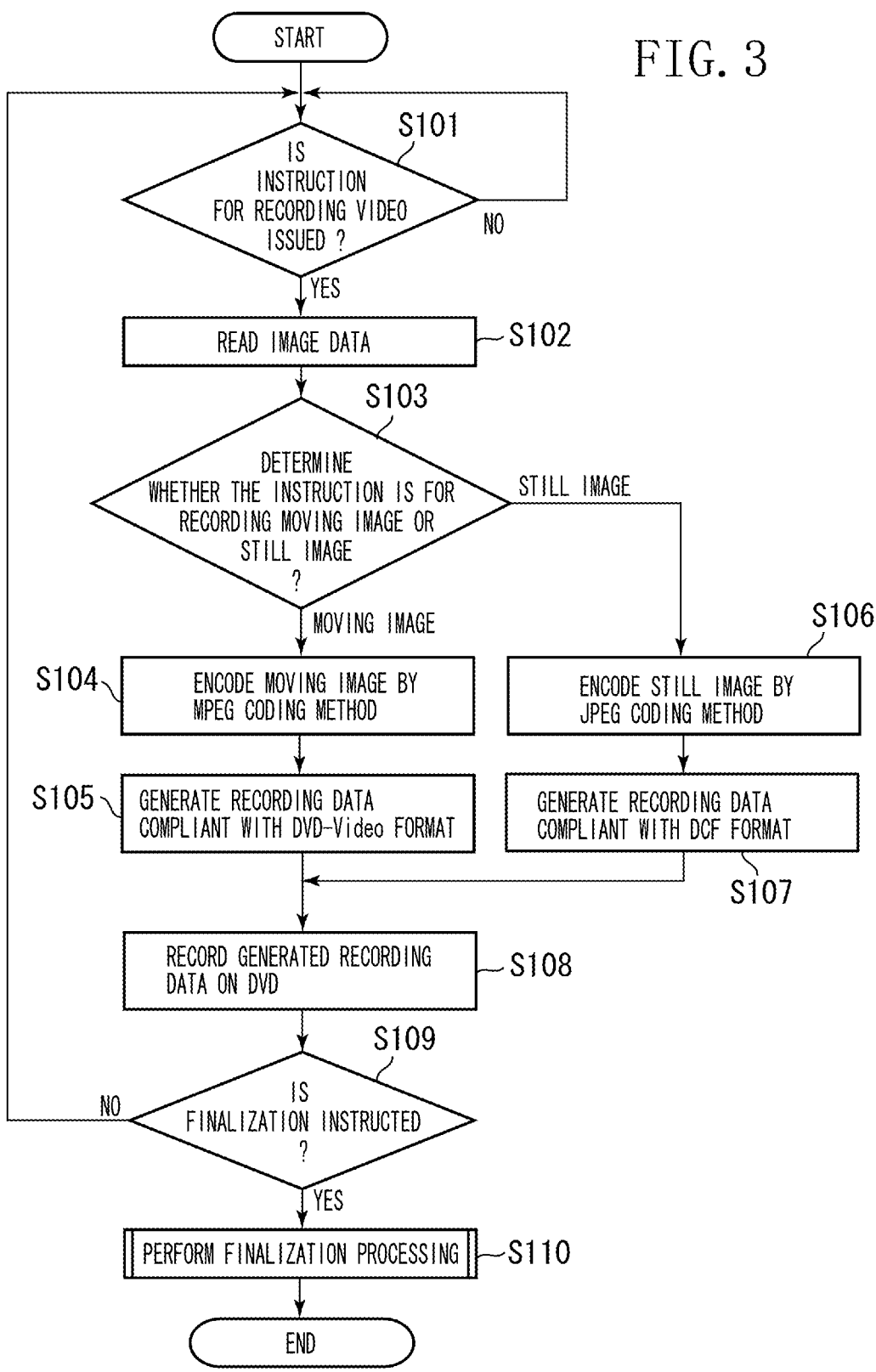
FIG. 3 is a flow chart illustrating an operation performed at the time of recording an image on a DVD according to the first exemplary embodiment of the present invention.

Referring to FIG. 3, first, if it is determined that an instruction for recording a video image is issued by a user based on an instruction signal from the operation unit 113 (YES in step S101), then in step S102, the CPU 110 causes the camera unit 100 to generate video data.

In step S103, the CPU 110 detects an instruction signal from either the shutter button 212 or the recording button 213 to determine whether an instruction from the user is an instruction for recording a moving image or recording a still image.

If it is determined in step S103 that the instruction from the user is an instruction for recording a moving image, the CPU 110 inputs video data into the MPEG encoder of the encoder unit 101. Then, in step S104, the MPEG encoder encodes the input moving image according to the MPEG coding method. In step S105, the encoder unit 101, under the control of the CPU 110, generates recording data according to a DVD format, using the encoded data, and outputs the generated recording data to the buffer memory 102. A format used for recording a moving image according to the present exemplary embodiment is DVD-Video format. However, the configuration of the present exemplary embodiment is not limited to this.

If it is determined in step S103 that the instruction from the user is an instruction for recording a still image, then in step S106, the CPU 110 inputs video data into the JPEG encoder of the encoder unit 101. The JPEG encoder encodes the input still image according to the JPEG coding method. In step S107, the encoder unit 101, under the control of the CPU 110, generates recording data according to DCF format, using the encoded data, and outputs the generated recording data to the buffer memory 102.

When the recording data of a JPEG still image or a MPEG moving image is stored in the buffer memory 102, the CPU 110 controls the disk access unit 103 to record the recording data stored in the buffer memory 102 on the disk 104 (step S108).

Thus, the video camera can record a moving image as MPEG data and a still image as JPEG data on a DVD. In step S109, the CPU 110 determines whether an instruction for finalization is issued by the user operating the finalize button 205 of the operation unit 113. If it is determined in step S109 that no instruction for finalization is issued (NO in step S109), processing returns to step S101 and the CPU 110 repeats the above control for recording. If it is determined in step S109 that the instruction for finalization is issued (YES in step S109), then in step S110, the CPU 110 performs finalization processing.

The finalization processing and processing for generating an MPEG moving image from a JPEG still image, which is performed during the finalization processing is described next.

In the present exemplary embodiment, an MPEG moving image is generated from a JPEG still image according to an instruction from a user issued via a screen for performing a setting for the finalization processing.

When receiving the instruction from the user, the CPU 110 reads all JPEG still images recorded on the disk 104 (DVD) via the disk access unit 103 and generates corresponding MPEG I pictures. Then, the CPU 110 additionally records the generated MPEG moving images on the disk 104.

Figure 4:
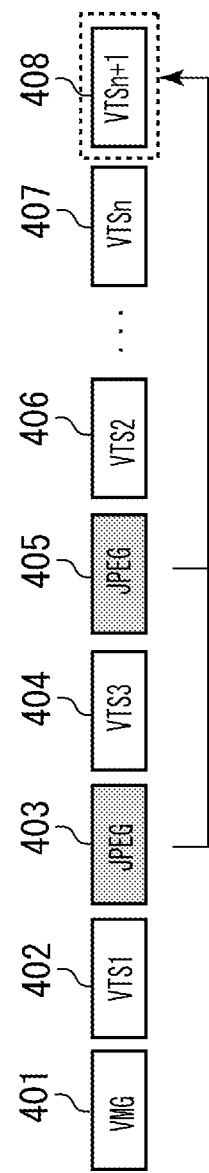
FIG. 4 illustrates the order of arrangement of recording data on a DVD according to the first exemplary embodiment of the present invention.

According to the DVD-Video format, the recording data is recorded on a DVD in an arrangement illustrated in FIG. 4.

Referring to FIG. 4, one Video Manager (VMG) 401 and a plurality of Video Title Sets (VTSs) 402, 404, and 406 exist. The VMG stores VTS management information required for reproducing the VTS. The VTS stores content of the moving image.

Each still image is recorded in a leading portion of a free space of the DVD available at the time of shooting. Accordingly, when a moving image and a still image are alternately picked up, a VTS and a JPEG still image are alternately recorded as illustrated in FIG. 4.

In the case of using the DVD-Video format, it is necessary to generate a VMG according to the state of a VTS. When a DVD-R is used as a recording medium, only writing of data can be performed. Accordingly, it is necessary to perform processing for generating a VMG at the last stage of recording. In addition, without a VMG, a conventional reproduction apparatus such as a DVD player cannot reproduce photographed data. Further, once finalization is performed, additional writing cannot be performed. Accordingly, finalization processing can be performed when a user does not desire to record additional data after recording a sufficient amount of photographed data on the recording medium.

Accordingly, particularly in the case of using a DVD-R, in converting a JPEG still image into an MPEG moving image, it is useful to perform this conversion at the same time as the finalization processing.

When a user has issued an instruction for converting a still image into a moving image at the time of performing a setting for finalization processing, the CPU 110 reads all still images (JPEG still images) recorded on the disk 104. Then, the CPU 110 additionally records an MPEG moving image as a new VTS (VTSn+1 408 in FIG. 4) that is generated by a conversion into a moving image based on the read still image data 403 and 405, subsequent to the last VTS (VTSn 407 in FIG. 4) that is data of a moving image photographed last.

In addition, in performing this processing, data indicating an interval time for displaying still images is inserted into a Cell Still Time of a VTSI area in which information on a moving image is stored in a VTS. Alternatively, a Sequence_end_code is added after each MPEG picture.

Then, the CPU 110 generates a VMG based on information on all the VTSs including the converted VTS and performs the finalization processing. Note that a format for recording a still image is not described in detail here. To briefly describe the still image recording format, management information according to Universal Disk Format (UDF) is recorded in an area (not shown) (for example, an area before the VMG).

Generating a DVD finalized as described above enables a still image converted into a moving image to be reproduced by a reproduction apparatus such as a DVD player. In reproducing the converted moving image, the reproduction of still images can be stopped every time one still image is reproduced, and in addition, a slide show like reproduction in which still images are switched to be reproduced every three seconds can be performed.

A format of a VTS including a still image (I picture) generated from a JPEG still image is described next with reference to FIG. 5.

Figure 5:
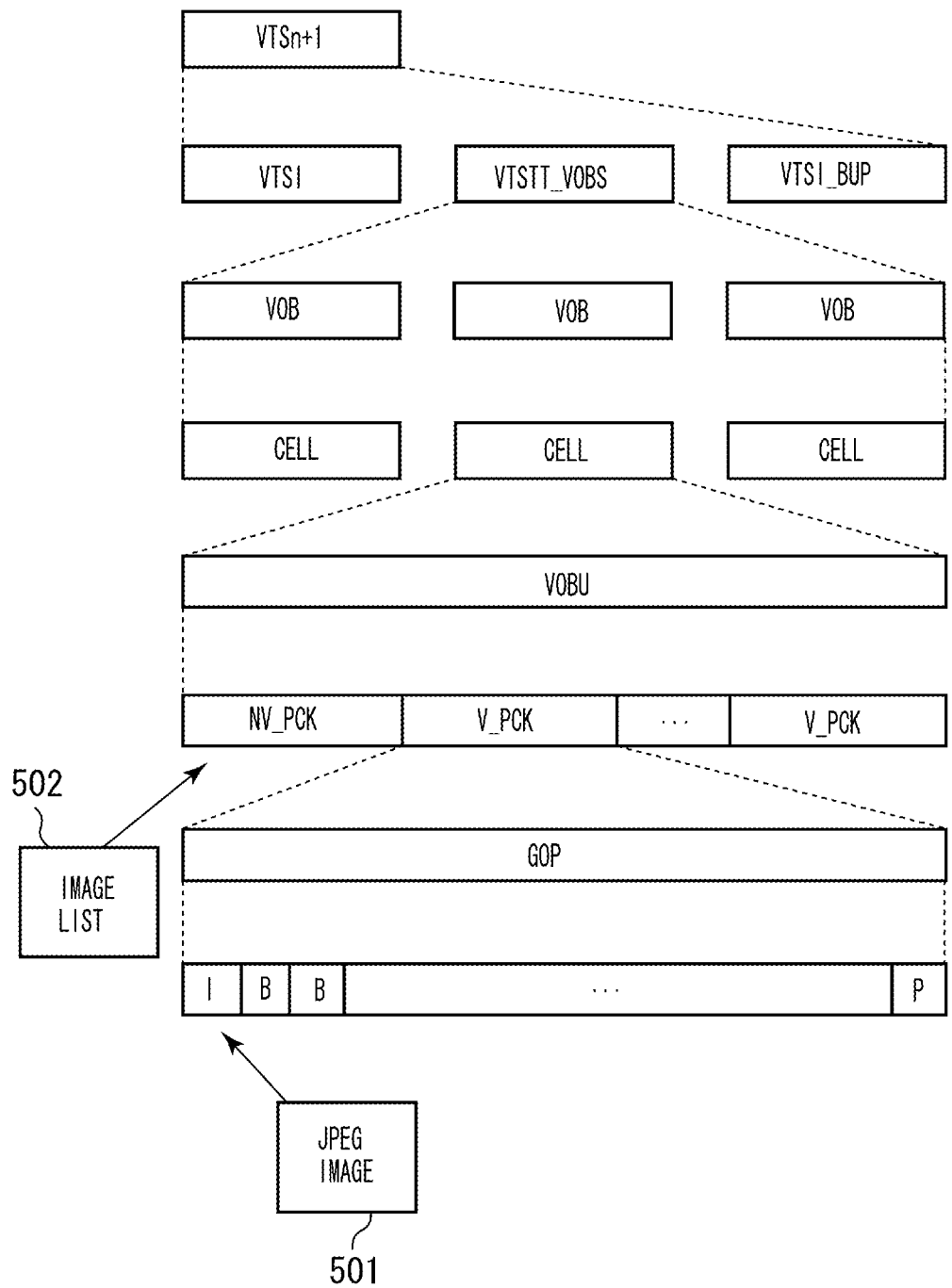
FIG. 5 illustrates a format of a Video Title Set (VTS).

Referring to FIG. 5, a VTS includes Video Title Set Information (VTSI) and a Video Object Set for Title (VTST-T_VOBS) The VTS further includes a Video Title Set Information Backup (VTSI_BUP). The VTSI is management information that is used for managing data in the VTST-T_VOBS to enable reading out data in a Video Object (VOB). The VTSI_BUP is a backup of the VTSI. The VTSI_BUP has the same content as the VTSI. The VTSTT_VOBS includes a plurality of VOBs. Each VOB is equivalent to a chapter.

Each VOB can include a plurality of CELLs. However, for easier understanding, it is assumed in the present exemplary embodiment that a VOB includes one CELL only.

Each CELL can include a plurality of Video Object Units (VOBUs). However, just as in the case of the VOB, for easier understanding, it is assumed in the present exemplary embodiment that a CELL includes one VOBU only.

In a VOBU, there is information for performing a search called a "Navigation Pack (NV_PCK)". After the NV_PCK, there are a plurality of Video Packs (V_PCKs). Each V_PCK includes a group of pictures (GOP). An MPEG I picture generated based on a JPEG still image 501 is included in a GOP in a V_PCK. If the MPEG I picture cannot be fully included in one V_PCK, the MPEG I picture can be divisionally included in a plurality of V_PCKS. An image list 502 (described below) is recorded in the NV_PCK.

A flow of processing for converting a JPEG still image into an MPEG moving image during the finalization processing in step S110 in FIG. 3 is described next with reference to FIG. 6.

First, in step S201, the CPU 110, in response to an input of an instruction from a user via the operation unit 113, performs a setting for the finalization processing. In the processing in step S201, the CPU 110 determines whether processing for generating an MPEG moving image from a JPEG still image is to be performed and if the processing for generating an MPEG moving image from a JPEG still image is to be performed, performs a specification as to which still image is to be used. It is assumed here that a setting for generating one MPEG moving image based on all the photographed JPEG still images is performed.

When the user issues an instruction for performing the finalization processing, the CPU 110 starts the processing for generating an MPEG moving image from JPEG still images. When the processing for generating an MPEG moving image from JPEG still images starts, the CPU 110 reads a JPEG still image picked up first (step S202).

In step S203, the CPU 110 decodes the JPEG still image and generates video data of an original still image.

In step S204, the CPU 110 detects the resolution of the decoded data and converts the resolution of the decoded data into a resolution corresponding to the MPEG format. In an ordinary case, the resolution of a JPEG still image is higher than the resolution of an MPEG moving image according to the DVD-Video format. Accordingly, the CPU 110 performs processing for reducing the decoded data so that the video data of the still image can conform to a resolution according to the MPEG format.

In step S205, the CPU 110 encodes the reduced video data as an MPEG I picture so as to convert the reduced video data into an MPEG stream.

In step S206, for the first still image, the CPU 110 newly generates a VTS, then generates a VOB in the VTS, and inserts the I picture into a VOBU in the VOB as a V_PCK.

If not all of the still images are converted into I pictures (NO in step S207), the CPU 110 again performs the reading of still image data in step S202, then repeats the above processing, and then adds an I picture to the VOB already generated.

After all of the photographed still images are completely converted (YES in step S207), the CPU 110 generates an image list indicating link information between the generated moving image data and the still image data (step S208).

Here, the image list refers to a list of the selected JPEG still images used as original still images for generating an MPEG moving image. As described above with reference to FIG. 5, the image list is previously generated and stored at the time of generating a moving image from selected still images.

The image list that is generated here is such as the one illustrated in FIG. 7A. Although not clearly illustrated in FIG. 7A, the still images are reproduced in order from top to bottom in FIG. 7A. The CPU 110 arranges the image list in a private stream existing in an NV_PCK.

Note that the image list is not limited to be arranged in a private stream. That is, the image list can be generated on a recording medium as independent data.

In step S209, the CPU 110 writes information of a VOB including the NV_PCK, in which the generated image list is arranged, into the VTSI.

In step S210, the CPU 110 collects information of all the VTSs to generate data to be included in a VMG.

In step S211, the CPU 110 writes management information onto the recording medium and performs the finalization processing.

By performing the above-described processing, MPEG data including all of the still images can be added on the recording medium, and thus the still images can be reproduced in a slide-show like manner by a reproduction apparatus such as a DVD player.

Furthermore, by previously selecting JPEG still images to be included in a moving image and performing the processing in steps S202 through S207 on the selected JPEG still images, conversion into an MPEG moving image of only the still images that the user desires to reproduce can be performed.

If the image recording apparatus includes such a function for converting only the selected JPEG still images into a moving image, a plurality of MPEG moving images for reproducing still images can be generated by selecting different sets of JPEG still images. In this case, the image list generated in step S208 is, for example, as illustrated in FIG. 7B. Such an image list and a plurality of MPEG moving images can be generated and utilized in the case of generating different moving images depending on places where still images have been picked up.

Figure 8A:
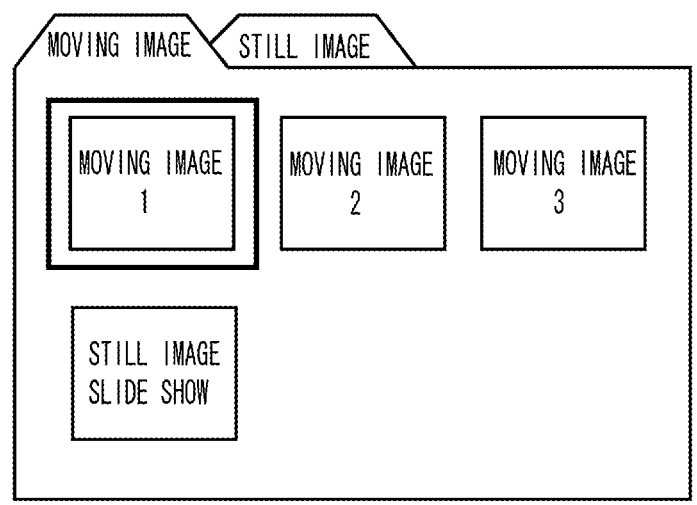
FIG. 8A and FIG. 8B each illustrate an example of a display screen according to the first exemplary embodiment of the present invention.
Figure 8B:
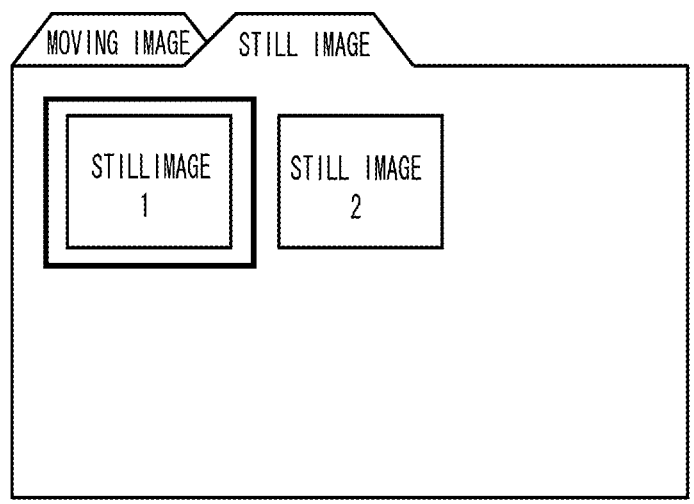

FIG. 8A and FIG. 8B each illustrate an example of a list display screen displayed when a moving image and a still image are reproduced. On the list display screen, a user can switch between a display of a moving image list and a display of a still image list by selecting tabs located in an upper portion of the list display screen.

Concerning a moving image, an image of a scene at the time of start of shooting, for example, an image in a leading frame of the moving image, is displayed as an identification image of the moving image (FIG. 8A). Concerning a still image, the photographed still image is reduced to be displayed. Hereinbelow, a reduced image displayed in the list display screen is referred to as a "thumbnail image". In reproducing a moving image, a user displays a list of moving images and selects a thumbnail image of a moving image that the user desires to reproduce, using the cross key 208 in the operation unit 113, to start reproducing the selected moving image. When the user desires to reproduce a still image, the user switches the list display screen to a display of the still image list (FIG. 8B) and selects a thumbnail of a still image that the user desires to reproduce. Thus, the still image is displayed in full screen.

In the case of using such a user interface, a moving image generated by converting a still image into a moving image is displayed in the moving image list. In reproducing the moving image generated by converting a still image into a moving image, the user selects a thumbnail of the moving image from the moving image list.

However, because the still image has been converted into a moving image, the resolution of the converted still image corresponds to a resolution conforming to the DVD-Video format. Accordingly, the image quality of the converted still image is lower than the image quality of an original still image. Accordingly, in reproducing a still image, the user can reproduce the still image with a high image quality by selecting and displaying the original JPEG still image from the still image list. Thus, in reproducing a still image, it is more useful for the user to display the original still image instead of a moving image generated by converting the still image.

If the image recording apparatus includes a slide show function in which still images are sequentially displayed at a constant time interval, the still images can be reproduced at a high image quality in a similar manner as the case of reproducing the moving image generated by converting the still images.

In reproducing a moving image generated by converting still images, the user cannot perform an operation for forwarding or rewinding the display on an image-by-image basis because of the characteristic of the DVD-Video format. Furthermore, a function for zooming a part of the image during display cannot be utilized by an apparatus other than an apparatus specifically corresponding to such a function. In addition, even in the case of using an apparatus having a zoom function, a user cannot reproduce a high-quality video image because the image whose quality has been lowered is magnified to be displayed. Thus, such a zoom function is not useful.

Furthermore, information concerning a date and time of shooting and camera settings at the time of shooting is, as well as image data, added to the original JPEG still image. However, such additional information is erased at the time of conversion of a still image into a moving image. Accordingly, at the time of reproducing the moving image, the user cannot refer to such additional information.

Figure 9:
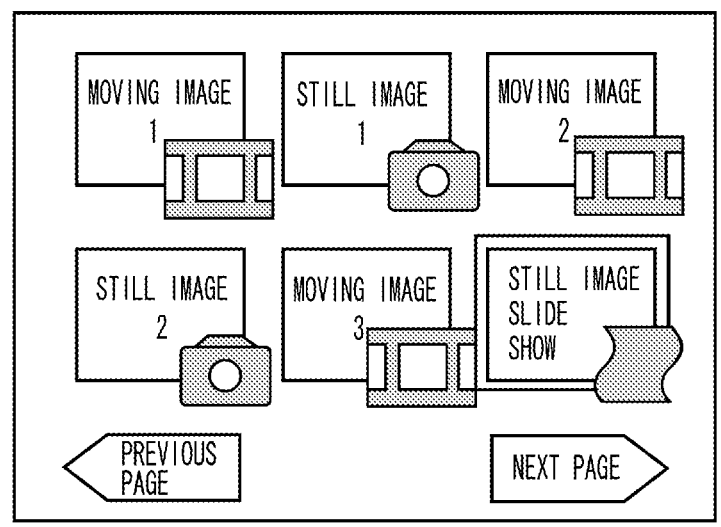
FIG. 9 illustrates an example of a display screen according to the first exemplary embodiment of the present invention.

In this regard, as illustrated in FIG. 9, in the present exemplary embodiment, all of the images are displayed in a list on the same screen, instead of displaying moving and still images in respective different screens. With this displaying method, the images can be arranged in a time-series order regardless of whether the image is a moving image or a still image.

In addition, icons are displayed in an overlapping manner with the images so that the user can discriminate among an MPEG moving image, a JPEG still image, and an MPEG moving image generated from a JPEG still image.

A flow of processing for generating a thumbnail image display screen according to the present exemplary embodiment and a flow of processing performed when the user selects a thumbnail image are described next with reference to FIG. 10.

Figure 10:
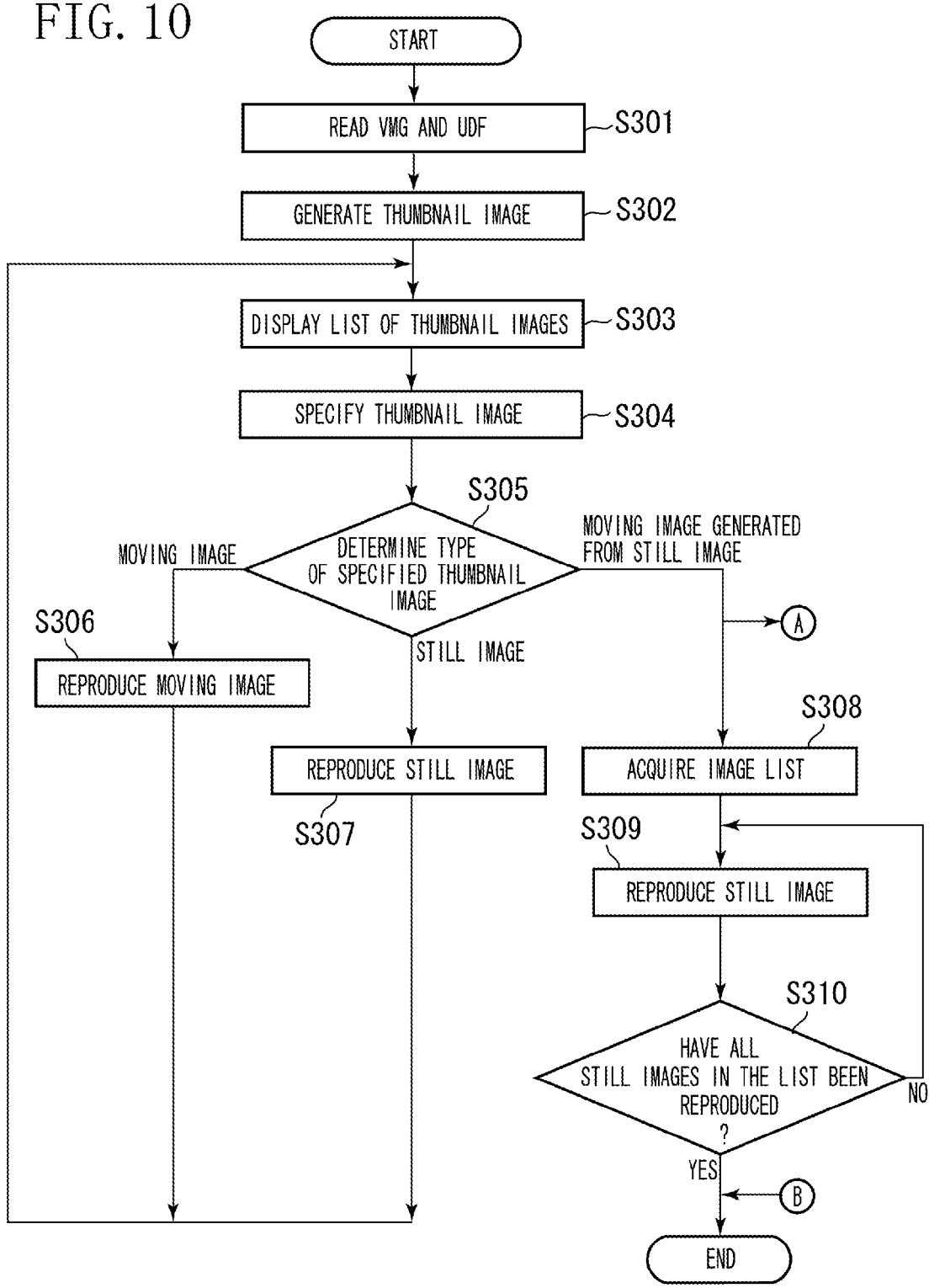
FIG. 10 is a flow chart illustrating display processing according to the first exemplary embodiment of the present invention.

Referring to FIG. 10, in step S301, in response to setting the video camera to a reproduction mode by the user operating a mode switching button in the operation unit 113, the CPU 110 reads a VMG and a UDF, which are management information recorded on a recording medium.

In step S302, the CPU 110 sorts the images in the order of recording time based on recording time information of each image recorded in the VMG and the UDF and generates thumbnail images of the images in the order of earlier recording time. In step S303, the CPU 110 causes the generated thumbnail images to be serially displayed on the LCD 108 starting with an upper-left portion of the screen.

In the present exemplary embodiment, a thumbnail image corresponding to an MPEG moving image generated from JPEG still images recorded as "VTSn+1" is displayed in a lower-right portion of the screen of the LCD 108. This thumbnail image is displayed even after a "next page" button is selected by the user.

In the present exemplary embodiment, a thumbnail image of each image is generated every time the video camera shifts to the reproduction mode. However, the configuration of the present exemplary embodiment is not limited to this. That is, if a thumbnail image is previously generated at the time of recording an image, the thumbnail image can be used.

In step S304, the user specifies a thumbnail image. In step S305, the CPU 110 determines an image type of the specified thumbnail image. If it is determined in step S305 that the specified thumbnail image corresponds to an MPEG moving image photographed by the user, then in step S306, the CPU 110 starts the reproduction of the moving image. In this case, the LCD 108 displays the reproduced moving image in full screen. If it is determined in step S305 that the specified thumbnail image corresponds to a still image photographed by the user, then in step S307, the CPU 110 displays the JPEG still image. In this case, the LCD 108 displays the reproduced still image in full screen.

If it is determined in step S305 that the specified thumbnail image corresponds to a moving image generated from a still image, then in step S308, the CPU 110 acquires an image list such as the one illustrated in FIG. 7A or FIG. 7B.

In step S309, the CPU 110 serially reproduces JPEG still images according to the acquired image list. When it is determined in step S310 that all of the still images in the image list have been completely reproduced (YES in step S310), the processing ends.

By reading a Cell Still Time at the time of conversion of JPEG still images into a moving image performed when reproduction of the converted still images starts and displaying the still images with the setting including the read Cell Still Time, the still images can be reproduced in a manner similar to the manner of reproduction of the moving image generated from JPEG still images, except that the image quality of the still images is higher than the image quality of the moving image generated by converting the JPEG still images.

If the user is allowed to specify a time for reproducing one image in performing an image reproduction in step S309, the images can be displayed in a manner such that the images are automatically switched to be displayed at an arbitrary time interval. In the case of a moving image recorded on a recording medium, because a Cell Still Time thereof is recorded on the recording medium, a time interval for displaying the moving image cannot be changed.

If no image list exists, all of the still images recorded on the recording medium are displayed in a slide show in the order of shooting date and time.

As described above, according to the present exemplary embodiment, a JPEG still image, which has a larger amount of information than an I picture of an MPEG moving image, is displayed. Accordingly, a high-quality still image can be displayed.

In the MPEG coding method, because a time for displaying one still image is fixed, the user cannot perform an image-forwarding operation and an image-rewinding operation. However, in the present exemplary embodiment, a JPEG still image is reproduced. Accordingly, the configuration of the present exemplary embodiment can be arranged such that the user can perform an image-forwarding operation and an image-rewinding operation by operating the cross key 208 in the operation unit 113.

Furthermore, by generating a plurality of image lists, the order of displaying still images can be specified by the user.

In the display screen according to the present exemplary embodiment, a thumbnail image is used as an identification image for specifying an image to be reproduced. However, the present invention is not limited to this. That is, the configuration can be arranged such that an identification image in another form such as a character image or an icon indicating an image name is displayed to allow a user to specify an image to be reproduced.

With the above-described processing, a high-quality image can be displayed at a more appropriate timing. In addition, operability can be improved.

Second Exemplary Embodiment

As described in the first exemplary embodiment, an MPEG moving image generated from a plurality of JPEG still images can be reproduced in an automatic slide show. Accordingly, there may be inconvenience to a user. In a second exemplary embodiment, a moving image is first reproduced, and depending on an image currently displayed, the user can switch the image reproduction to a still image only when the user intends to reproduce the still image.

Figure 11:
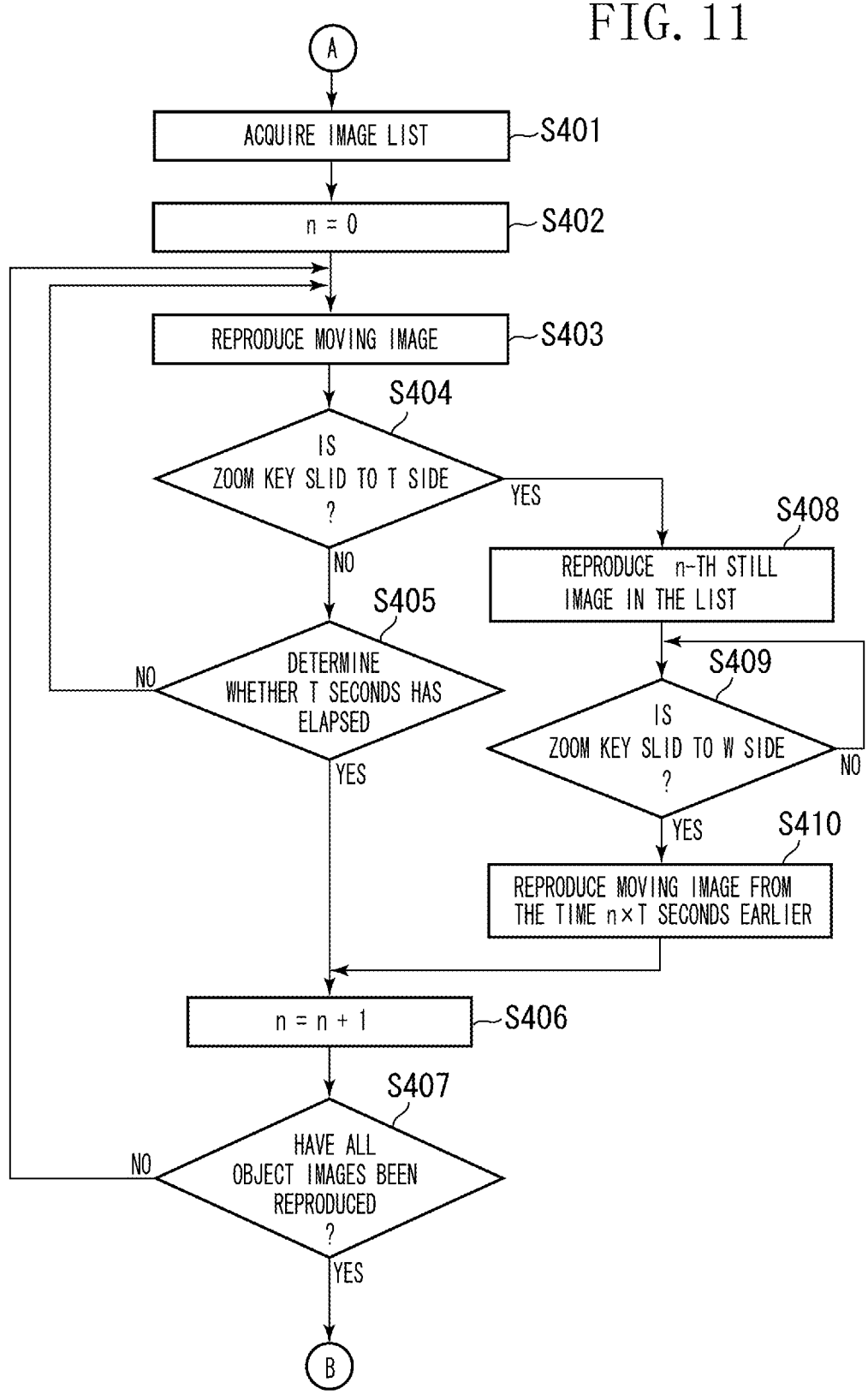
FIG. 11 is a flow chart illustrating display processing according to a second exemplary embodiment of the present invention.

FIG. 11 is a flow chart of processing according to the second exemplary embodiment. The flow of processing illustrated in FIG. 11 differs from that of the first exemplary embodiment only as to the processing performed when a reproduction of a moving image generated from a still image is specified in the flow chart of FIG. 10. Thus, branched processing "A" in FIG. 10 is equivalent to a start of the processing illustrated in FIG. 11.

Referring to FIG. 11, in step S401, the CPU 110 acquires an image list as in the case of the first exemplary embodiment. In step S402, the CPU 110 resets an image number counter n to "0".

In step S403, unlike the first exemplary embodiment, the CPU 110 starts reproducing an MPEG moving image. In step S404, the CPU 110 determines whether the zoom key 211 is slid to the T side.

If it is determined in step S404 that the zoom key 211 is not slid to the T side (NO in step S405), then in step S405, the CPU 110 determines whether T seconds (for example, three seconds), which represents a switching time of one image in a slide show, has elapsed. If it is determined in step S405 that T seconds has elapsed (YES in step S405), the CPU 110 increments the image number counter n by one (step S406). Unless the user operates the zoom key 211, the CPU 110 repeats the above-described processing until all of the object images are reproduced (until "n" reaches the number of listed images and the reproduction of the moving image is completed) (step S407). In other words, if it is determined that all object images have not been reproduced (NO in step S407), processing returns to step S403. When it is determined that all object images have been reproduced (YES in step S407), processing ends.

If it is determined in step S404 that the zoom key 211 is slid to the T side, then in step S408, the CPU 110 displays an n-th still image in the image list instead of the moving image. In step S409, the display of the n-th still image is continued until the user slides the zoom key 211 to the W side.

If the zoom key 211 is operated to the W side (YES in step S409), then in step S410, the CPU 110 resumes the moving image display by switching to a moving image corresponding to a time earlier by n*T seconds, namely, a time at which the image display has been switched to a still image.

As described above, in the present exemplary embodiment, in response to the operation of the zoom key 211 by the user, a moving image for slide show and one still image corresponding to the moving image can be displayed. Accordingly, the user can view a high-quality JPEG image for images the user intends to reproduce while continuing to display the moving image in a slide show. Thus, the user can confirm an image more conveniently.

In addition, the user can perform an intuitive operation by utilizing the zoom key 211 for changing a magnification. Accordingly, even in the case of a slide show of a moving image in which images are switched in a short length of time of three seconds, for example, the user can confirm the desired image and switch between images without a failure in operation.

Third Exemplary Embodiment

In the first exemplary embodiment, when the user specifies a slide show thumbnail image, a slide show of JPEG still images is automatically started. However, some users may not desire to immediately view the slide show of JPEG still images.

Suppose an owner of a video camera generates a slide show of a moving image (an MPEG moving image generated from a plurality of still images) using the video camera and performs an operation for reproducing an image using the video camera. In this case, it is likely that the user directly reproduces a JPEG still image without reproducing a moving image generated by the user in a slide show.

On the other hand, in reproducing an image from a DVD on which images were recorded by a video camera that is owned by a person other than the user, it is likely that the user desires to confirm an outline of content of the DVD by reproducing a moving image in a slide show first, rather than immediately reproducing JPEG still images one by one. Furthermore, in the case where a person who is not an owner of the video camera acquires only a recording medium to reproduce an image using another apparatus, it is likely that the user, who is not the owner of the video camera, desires to confirm an outline of content of the recording medium first, as in the above-described case.

In a third exemplary embodiment, an image to be displayed in priority is switched according to whether a moving image slide show (an MPEG moving image generated from a plurality of still images) recorded on a DVD to be displayed is the one generated by a video camera used for reproduction.

Figure 12:
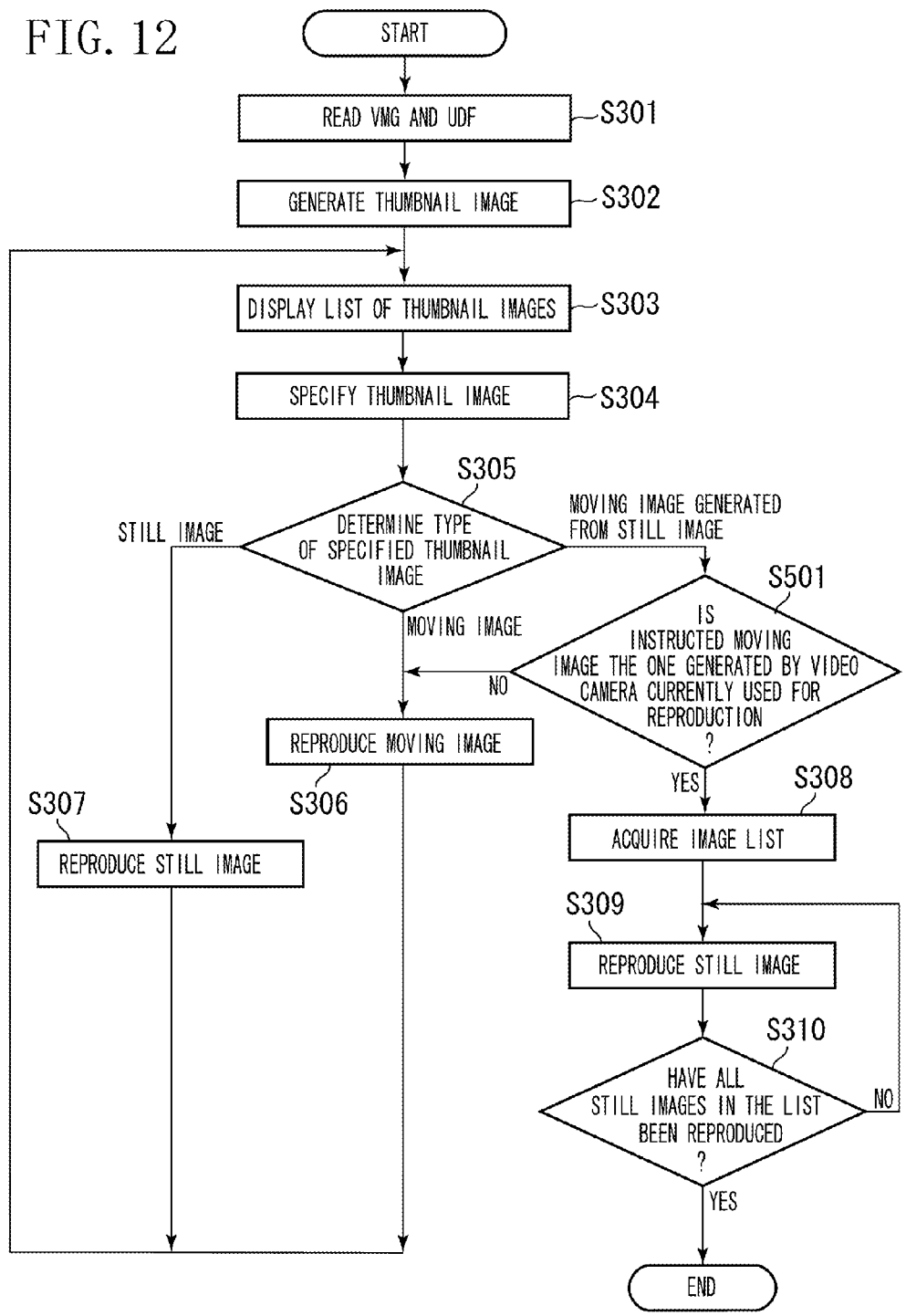
FIG. 12 is a flow chart illustrating display processing according to a third exemplary embodiment of the present invention.

FIG. 12 is a flow chart illustrating display processing according to the third exemplary embodiment. The steps similar to those in the first exemplary embodiment are provided with the same reference numerals and symbols, and a description thereof is not repeated here.

In the third exemplary embodiment, the processing performed after step S305, in which the user specifies a moving image generated from a still image, is different from the first exemplary embodiment. In the third exemplary embodiment, after determining in step S305 that the specified thumbnail image is a moving image generated from a still image, in step S501, the CPU 110 determines whether the instructed moving image is the one generated by the video camera that is currently used for reproduction. This determination can be made by referring to a VMG, for example, and checking management information of the "VTSn+1". That is, device information is stored while being associated with the VMG at the time of generation of the "VTSn+1".

If it is determined that the instructed moving image is the one generated by the video camera that is currently used for reproduction (YES in step S501), then in steps S308 through S310, the CPU 110 performs the processing similar to that in the first exemplary embodiment. If it is determined that the instructed moving image is not the one generated by the video camera that is currently used for reproduction (NO in step S501), the processing advances to step S306. In step S306, the CPU 110 displays the generated MPEG moving image in a slide show.

As described above, in the present exemplary embodiment, if an MPEG moving image generated from a still image is not the one generated by the video camera that is currently used for reproduction, the MPEG moving image itself is reproduced. On the other hand, if an MPEG moving image generated from a still image is the one generated by the video camera that is currently used for reproduction, a plurality of JPEG still images corresponding to the MPEG moving image are reproduced.

Accordingly, images can be reproduced in the order according to the desire of the user operating the video camera. Thus, the user's operability can be improved.

Fourth Exemplary Embodiment

In a fourth exemplary embodiment, an example is described in which a video is displayed by an external video display apparatus via the external output terminal 106 of the video camera illustrated in FIG. 1.

The external output terminal 106 according to the fourth exemplary embodiment includes a D terminal and a component output function, and is capable of outputting a high-definition television signal. Using a high-definition television signal, a high-definition video signal such as a 720p video signal and a 1080i video signal can be output. Here, each of a 480i video signal, a 720p video signal, and a 1080i video signal has a mutually different number of video signal scanning lines. As the number of video signal scanning lines becomes greater, a resolution of the video image becomes higher. The 480i is a format used for an ordinary television broadcast. The 720p and the 1080i are formats used for a high-definition broadcast.

The decoder unit 105 generates a high-quality video signal according to the above-described format and outputs the generated video signal to the external output terminal 106. That is, as in the case of the first exemplary embodiment, an original JPEG still image, instead of the MPEG moving image itself, is decoded, resized, and output.

Because in the MPEG coding method according to the DVD-Video format, encoding is performed with a resolution of 480i, a video output has a resolution corresponding to 480i. In the case of using a JPEG still image, in an ordinary case, the JPEG still image is reduced to a resolution of 720p or 1080i, rather than being reduced to a resolution of 480i, and the reduced JPEG still image is output as a video signal. Thus, the still image can be displayed with a higher image quality.

Fifth Exemplary Embodiment

In the first exemplary embodiment, an example is described in which the present invention is applied to an image recording apparatus such as a DVD video camera. In a fifth exemplary embodiment, an example in which the present invention is applied to an image display apparatus is described. The image display apparatus can be a personal computer, a digital television set, or a DVD player, for example.

Figure 13:
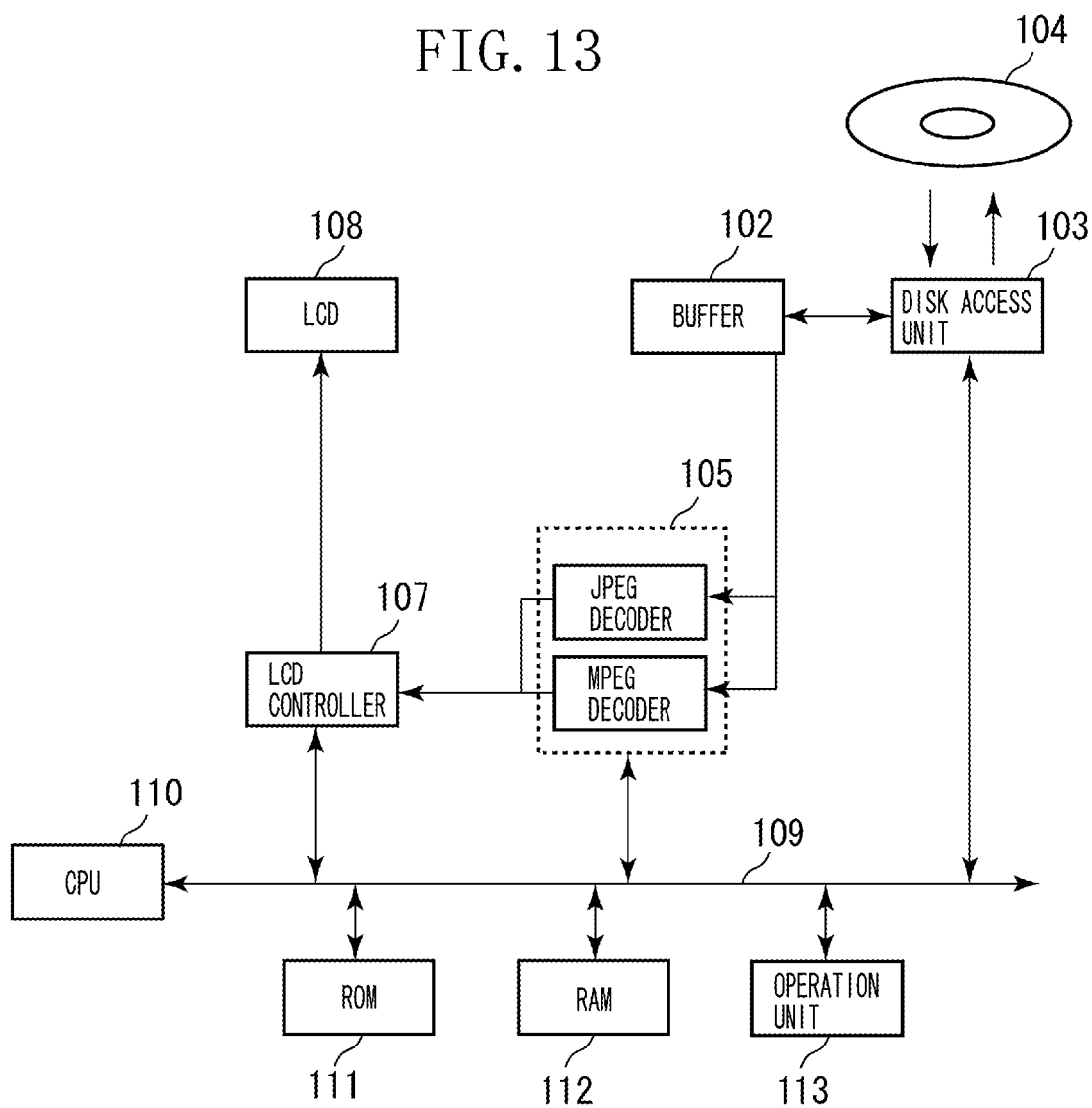
FIG. 13 illustrates a functional configuration of an image display apparatus according to a fifth exemplary embodiment of the present invention.

FIG. 13 illustrates an exemplary configuration of the image display apparatus according to the fifth exemplary embodiment. The processing according to the fifth exemplary embodiment is similar to that according to the first exemplary embodiment. That is, in the processing according to the fifth exemplary embodiment, after the image display apparatus recognizes a DVD, the processing illustrated in FIG. 10 is performed.

Other Exemplary Embodiments

The present invention can also be achieved by providing a system or an apparatus with a storage medium storing program code (software) implementing the functions of the embodiments and by reading and executing the program code stored in the storage medium with a computer of the system or the apparatus (a CPU or an MPU).

In this case, the program code itself, which is read from the storage medium, implements the functions of the embodiments described above, and accordingly, the storage medium storing the program code and a program constitute the present invention.

As the storage medium for supplying such program code, a flexible disk, a hard disk, an optical disk, a magneto-optical disk, a CD-ROM, a CD-R, a CD-RW, a DVD-ROM, a DVD-RAM, a DVD-RW, a DVD-R, a magnetic tape, a nonvolatile memory card, and a ROM, for example, can be used.

In addition, the functions according to the embodiments described above can be implemented not only by executing the program code read by the computer, but also implemented by the processing in which an OS (operating system) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-050589 filed Feb. 27, 2006, which is hereby incorporated by reference herein in its entirety.

What is claimed is:

1. An image recording apparatus configured to record a still image and a moving image on a recording medium, the image recording apparatus comprising:
   a still image recording unit configured to encode a still image according to a still image coding method and to record the encoded still image on the recording medium;
   a moving image recording unit configured to encode a moving image according to a moving image coding method and to record the encoded moving image on the recording medium as a normal moving image;
   a generation unit configured to generate the moving image encoded according to the moving image coding method from a plurality of still images encoded according to the still image coding method and to record the generated moving image on the recording medium;
   an identification image display control unit configured to cause an identification image of the still image, the normal moving image, and the moving image generated from the plurality of the encoded still images which are recorded on the recording medium to be displayed on a display unit;

a determination unit configured to determine an image type of the identification image specified via the display unit;

a moving image information display control unit configured to, if the determination unit determines the image type is the normal moving image, cause a moving image corresponding to an identification image specified via the display unit to be displayed on the display unit; and a still image information display control unit configured to, if the determination unit determines the image type is the still image, cause a still image corresponding to the identification image specified via the display unit to be displayed on the display unit;

wherein, if the determination unit determines the image type is the moving image generated from the plurality of the encoded still images, the moving image information display control unit does not cause the moving image generated from the plurality of the encoded still images to be displayed on the display unit, but the still image information display control unit causes a plurality of still images encoded according to the still image coding method from which the moving image has been generated to be sequentially displayed on the display unit.

2. The image recording apparatus according to claim 1, wherein the moving image coding method includes an MPEG coding method.

3. The image recording apparatus according to claim 2, wherein the moving image recording unit is configured to record an MPEG moving image according to one of DVD-Video format or DVD Video Recording format.

4. The image recording apparatus according to claim 1, wherein the still image coding method includes a JPEG coding method.

5. The image recording apparatus according to claim 1, wherein the still image information display control unit is configured to cause the plurality of still images to be sequentially displayed on the display unit at a predetermined time interval.

6. The image recording apparatus according to claim 1, wherein the still image information display control unit is configured to, according to an instruction generated by a user, switch a display from a still image currently displayed to a still image to be displayed next.

7. The image recording apparatus according to claim 1, further comprising an external output unit configured to, if an identification image specified via the display unit is an identification image corresponding to a moving image generated by the generation unit, reduce or magnify, according to a resolution of an output destination, a plurality of still images encoded according to the still image coding method from which the moving image has been generated and to output the reduced or magnified plurality of still images to the output destination.

8. The image recording apparatus according to claim 1, wherein the generation unit is configured to generate a list indicating a correspondence relationship between the generated moving image and the plurality of still images from which the moving image has been generated, and wherein the still image information display control unit is configured to cause still images to be displayed on the display unit based on the list generated by the generation unit.

9. A method for an image recording apparatus configured to record a still image and a moving image on a recording medium, the method comprising:

encoding a still image according to a still image coding method;

recording the encoded still image on the recording medium;

encoding a moving image according to a moving image coding method;

recording the encoded moving image on the recording medium as a normal moving image;

generating the moving image encoded according to the moving image coding method from a plurality of still images encoded according to the still image coding method;

recording the generated moving image on the recording medium;

displaying an identification image of the still image, the normal moving image, and the moving image generated from the plurality of the encoded still images which are recorded on the recording medium;

determining an image type of the identification image specified via the display unit;

displaying, if the determination unit determines the image type is the still image, a still image corresponding to the identification image specified via the display unit;

wherein, if the image type is determined the moving image generated from the plurality of the encoded still images, the moving image generated from the plurality of the encoded still images is not to be displayed on the display unit, but a plurality of still images encoded according to the still image coding method from which the moving image has been generated is sequentially displayed on the display unit.

* * * * *